United States Patent
Rummel

[15] 3,679,025
[45] July 25, 1972

[54] INFLATABLE SLIDE AND RAFT APPARATUS

[72] Inventor: Samuel L. Rummel, East Brunswick, N.J.
[73] Assignee: The Garrett Corporation, Los Angeles, Calif.
[22] Filed: May 18, 1971
[21] Appl. No.: 144,646

Related U.S. Application Data

[63] Continuation of Ser. No. 824,928, May 15, 1969.

[52] U.S. Cl. .................................. 182/20, 193/25, 9/11, 182/48
[51] Int. Cl. ................ B65g 11/10, B63b 7/08, A62b 1/20
[58] Field of Search ............... 182/48, 20; 193/25 B; 9/11 A

[56] References Cited

UNITED STATES PATENTS

| | | | |
|---|---|---|---|
| 2,933,739 | 4/1960 | Miller | 9/11 |
| 3,370,684 | 2/1968 | Hollcombe | 193/25 B |
| 3,433,342 | 3/1969 | Switlik | 193/25 B |
| 3,461,995 | 8/1969 | Mitchell | 193/25 B |
| 3,464,515 | 9/1969 | Evans | 193/25 B |
| 3,470,991 | 10/1969 | Hollcombe | 193/25 B |
| 3,458,009 | 7/1969 | Favors | 182/48 |

FOREIGN PATENTS OR APPLICATIONS

1,206,936  9/1970  Great Britain ........................ 182/48

*Primary Examiner*—Reinaldo P. Machado
*Attorney*—Orville R. Serdner and John N. Hazelwood

[57] ABSTRACT

An inflatable escape slide apparatus has a somewhat stretchable slideway sheet extending from end-to-end of the slide frame. A relatively non-stretchable separator strip under the sheet also extends from slide end to slide end, permitting evacuees to slide in non-interfering side-by-side escape down the sheet. If evacuation occurs on water, separately inflatable wing-like frame members on either side of the slide frame are inflated to form a large raft.

12 Claims, 9 Drawing Figures

INVENTOR.
SAMUEL L. RUMMEL

BY Orville R. Seidner

AGENT

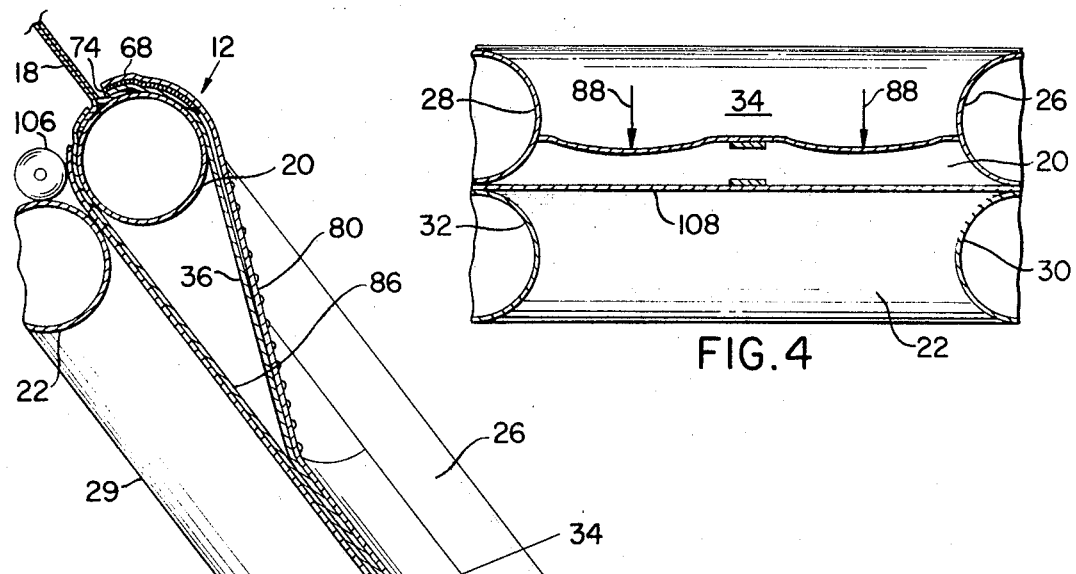
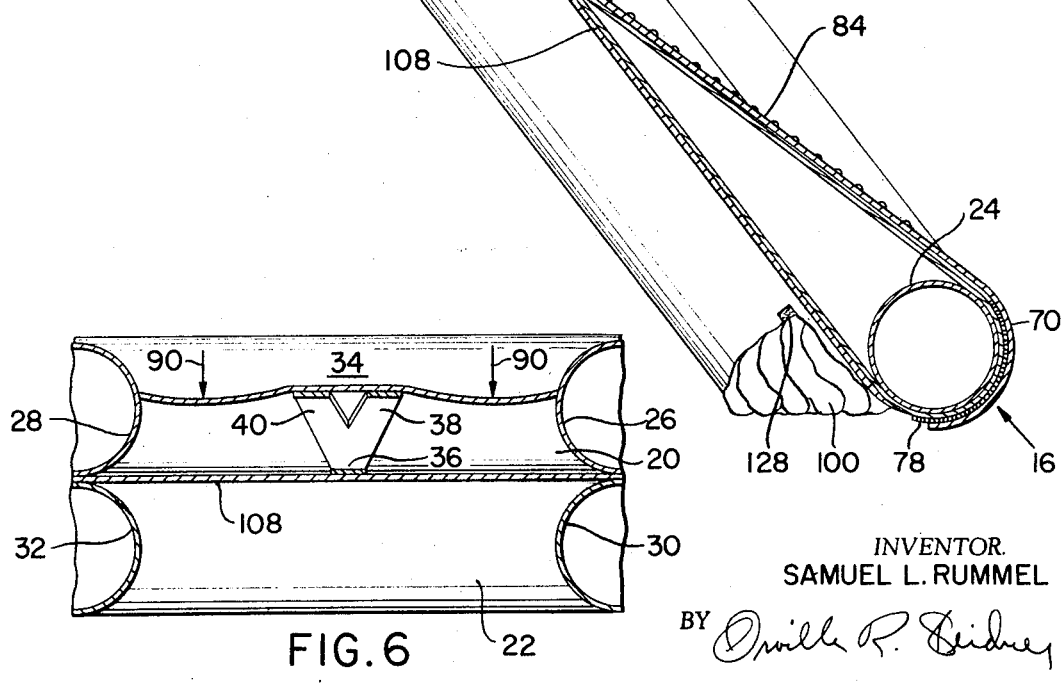

INVENTOR.
SAMUEL L. RUMMEL
BY Orville R. Seidner
AGENT

Patented July 25, 1972 3,679,025

INVENTOR.
SAMUEL L. RUMMEL

BY Orville R. Seidner

AGENT

INFLATABLE SLIDE AND RAFT APPARATUS

This is a continuation of U.S. application Ser. No. 824,928, filed May 15, 1969, and now abandoned.

BACKGROUND OF THE INVENTION

This invention relates in general to inflatable apparatus, and is concerned more particularly with a dual purpose inflatable escape slide and flotation raft for use in connection with downed aircraft. Specifically, the invention is directed to the combination of a primary inflatable escape slide arrangement, permitting side-by-side evacuation from an aircraft, with a secondary separately inflatable apparatus permitting expansion of the inflated primary apparatus to a flotation raft having increased carrying capacity.

In the prior art, the escape slides for rapid evacuation from air craft under emergency conditions have characteristically provided only a single slide path for evacuees who ordinarily approach the egress hatch-way from a single direction in the aircraft cabin. Thus, evacuation takes place one person at a time, albeit rapidly one after another.

With the advent of the larger "airbus" type aircraft to carry hundreds of passengers, new problems are presented in designs having wider doorways, for example midship between the ends of the passenger cabin, to accommodate passengers embarking or debarking in relatively non-interfering side-by-side relationship. In a typical example, the newer aircraft may have midship door openings of 42 inches minimum width, and it is apparent that in the event of an emergency evacuation through a doorway of that width, it is necessary that the escape chute be of sufficient width to accommodate persons in side-by-side sliding evacuation from the aircraft, particularly so if passengers scramble toward the doorway from both directions within the cabin.

In connection with the side-by-side evacuation, it should be noted that the sliding surface provided by the usual inflatable apparatus, is somewhat resiliently displacable by the sliding masses, hence tends to become somewhat concavely configured by each evacuee and cause the side-by-side sliding masses to converge toward each other. It is absolutely necessary that there be no interference as between sliding masses for several reasons. Firstly, persons bumping into each other on the slide, at the sliding velocities involved, are apt to cause incidental injuries to one another. These injuries might be minor in physical nature, but contributory to greater psychic trauma due to the nature of the incident necessitating emergency escape from the aircraft. Secondly, it is most important that evacuees, upon reaching the bottom of the slide, should be so positioned as to be enabled to execute a relatively rapid leaping start away from the bottom of the slide in order to make way for the following evacuees. This requirement is next to impossible to meet, if there is any collision interference at all between evacuees on the slide.

It would be possible, of course, to provide two of the prior art slides in side-by-side disposition to take care of the evacuation of the aircraft. This provisional mode would double the weight of escape slides required for the aircraft, and it is well-known that every pound of dead weight carried by an aircraft is a penalty pound which displaces a pound of revenue producing live or cargo weight.

It is also known in the prior art to utilize the inflated escape slide for a flotation raft for passengers in the event of an emergency ditching of the aircraft in flight over a body of water. However, by reason of its relatively elongate configuration as compared with its width, an escape slide is at best a poor substitute for a raft since it is relatively more subject to capsizing in heavy seas or choppy waves, if it becomes swamped broadside in the trough of the waves.

SUMMARY OF THE INVENTION

The present invention solves the problem of providing inflatable escape slides for rapid and massive evacuation of people from a relatively large door opening in an aircraft. The solution is arrived at in a slide which is substantially twice as wide while at the same time being characterized by merely a slight increase of weight which is substantially less than twice the weight of the usual single slide.

A feature of the novel slide is that the somewhat resilient fabric material which forms the slide surface is supported by a separator slide of flexible but relatively non-stretchable tubular structure from end-to-end of the slide substantially midway between the sides thereof, the support tending to effect a separation of evacuees in side-by-side-non-interfering descent down the slide. Preferably, the lower one-third of the separator strip is bifurcated so as to induce a divergence of evacuees from one another, as they reach the bottom of the slide, so that they are urged to a diverging leaping start away from the bottom of the slide.

The present invention also is adapted to utilize the inflatable slide structure as a flotation raft, the primary inflatable tubular frame of the slid having an additional wing-like inflatable tubular structure on one or both sides thereof and which are separately inflatable from the primary frame. Thus, the apparatus is dual purpose in that in one mode it is used as a slide by inflation of the primary frame, and separate inflation of the wing-like peripheral tubular members, of which the additional structure is comprised adapts the inflated apparatus to use as a flotation raft.

Preferably, the peripheral tubular members are detachable secured to the inflatable side beam members of the primary frame. Thus, when it is desired to use the apparatus only in the escape slide mode, it is merely necessary to inflate only the primary frame, and the peripheral or additional frame remains gathered near and detachably secured to the primary frame. When it is desired to use the apparatus in the raft mode, the peripheral portion is easily detached from the primary frame after inflation of the latter, by independent inflation of the former, inflation of which results in the automatic detachment procedure. When the additional frame is inflated, the elongate inflated slide is supplemented by the wing-like peripheral frame members to form a raft structure which is approximately equidimensional in transverse and longitudinal directions.

The advantage of the structural arrangement aforesaid is that when the apparatus is inflated for use in the slide mode only, to be followed thereafter by deflation, refolding and repackaging into the container, the wing-like peripheral frame portions are uninflated and secured to the primary frame beams, for example, and hence keep from waving or flapping in the breeze or wind if there be any. Furthermore, repackaging time is reduced because upon deflation of the primary frame, the start of refold and repackage of the entire apparatus is enhanced by the fact that the combined primary frame beams and attached peripheral frame portions are the starting point for a quick and simple refold procedure.

It is apparent, also, that by inflation of the primary frame alone when only the slide mode is to be utilized, there is a reduced requirement for compressed air or other elastic fluid to recharge the inflation system when repackaged for further use.

BRIEF DESCRIPTION OF THE DRAWINGS

FIG. 4 is a fragmentary transverse cross-section view of a portion of the slide taken on the line 4—4 of FIG. 2;

FIG. 5 is a longitudinal cross-section view of the slide taken on the line 5—5 of FIG. 2;

FIG. 6 is a view similar to FIG. 4, taken on the line 6—6 of FIG. 2;

DESCRIPTION OF THE PREFERRED EMBODIMENTS

Figures 1, 2, 3:
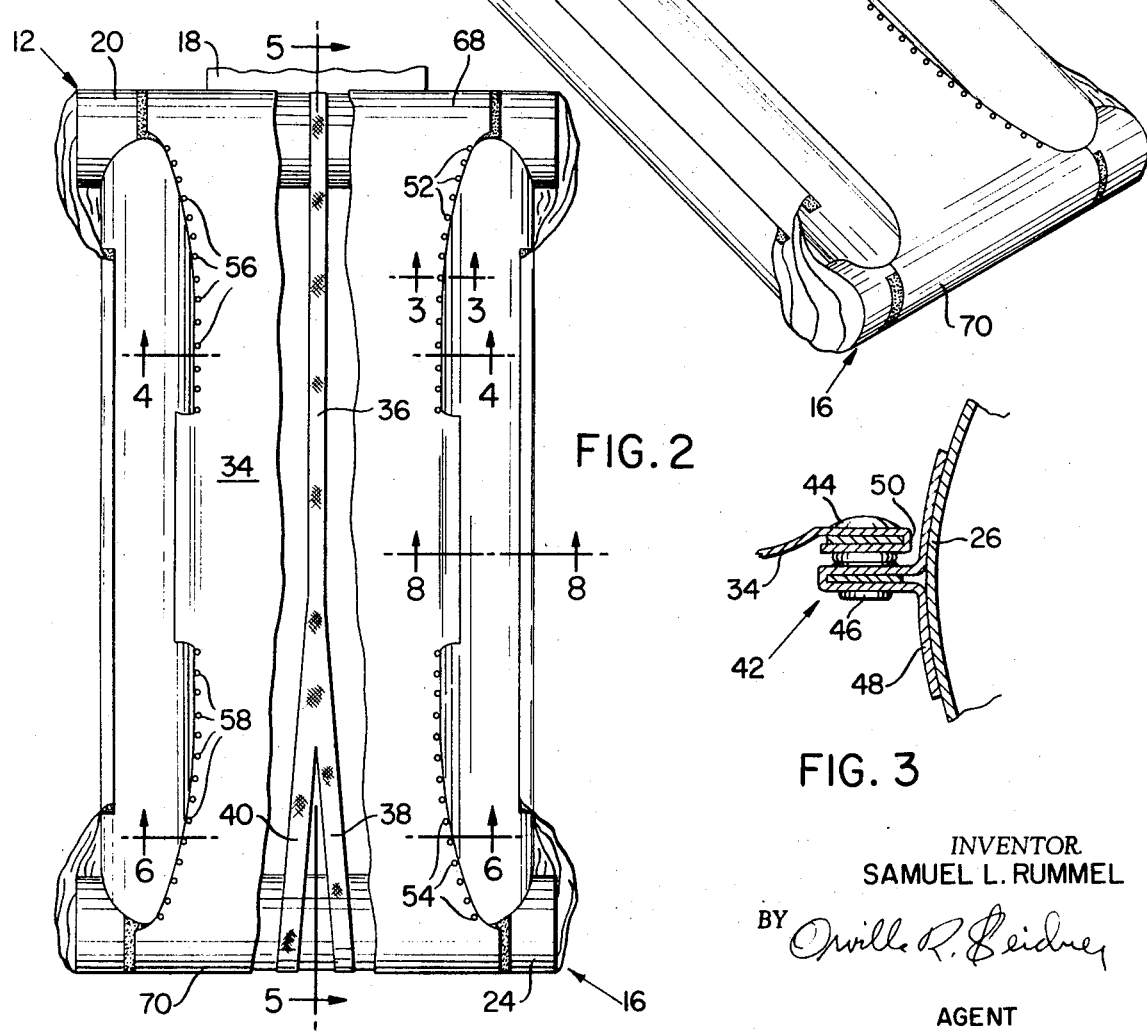
FIG. 1 is a perspective view, partially schematic, showing the invention as employed in the slide mode.
FIG. 2 is a plan view of the slide of FIG. 1 with a portion of the slideway fabric sheet broken away to reveal the separator strip of the invention.
FIG. 3 is a fragmentary cross-section view taken on the line 3—3 of FIG. 2.
Figure 9:
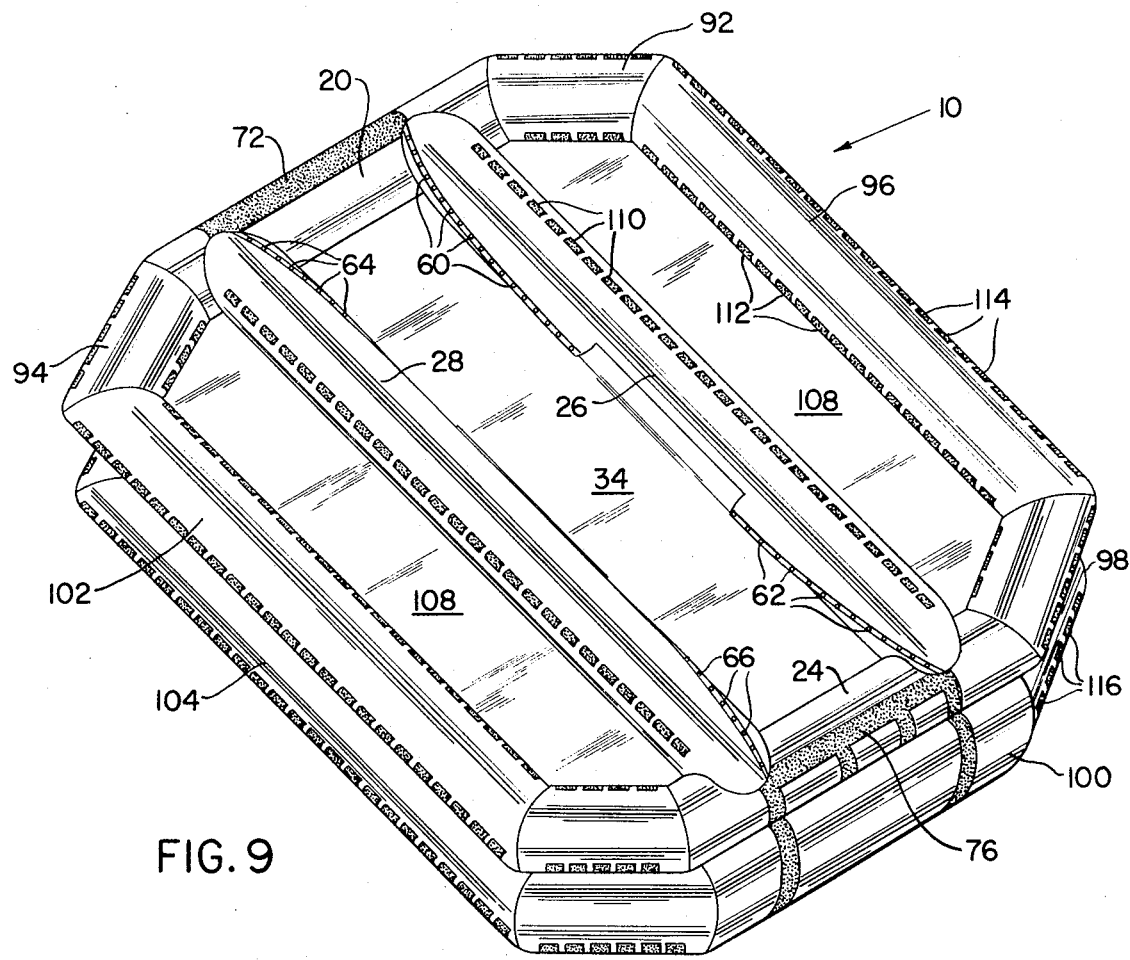
FIG. 9 is a perspective view of the fully inflated apparatus as it appears in the flotation raft mode.

Referring to FIG. 1, the flexible walled, fluid distensible, inflatable apparatus 10 is illustrated as inflated and disposed in the slide mode; whereas the alternate inflated flotation raft mode is illustrated in FIG. 9. As shown in FIG. 1, the apparatus 10 is inflated and deployed with an elevated end 12 thereof securely positioned adjacent an egress hatchway 14 which is elevated above a ground plane (not shown) adjacent which the other lower end 16 of the apparatus 10 is positioned.

It should be noted that the apparatus 10 when uninflated is normally folded and stowed in a container or compartment (not shown) within the structure defining the hatchway 14 or stowed in a chamber adjacent the hatchway. The apparatus is particularly efficacious for use with aircraft as an emergency escape chute in the slide mode, or as a flotation raft when the aircraft is forced to ditch in a body of water. It will be apparent, of course, as brought out hereinbelow, that the slide mode usefulness of the apparatus 10 is not restricted to aircraft usage, but also would be efficacious for the evacuation of animate or inanimate objects or human personnel from the upper stories of fixed structures in the event of fires, earthquakes or like disasters. In such a case, the apparatus 10 could be disposed in a container adjacent the emergency escape egress hatchway, to be inflated and deployed in the event of an emergency requirement therefor. As stated, the elevated end 12 is disposed adjacent the egress hatchway 14 and many be securely positioned thereat by means of a girt 18, one end of which is secured to the elevated end 12 of the slide, and the other end of which is secured to the structure defining the hatchway 14. The attachment of the girt 18 to slide end and to the structure is well-known in the art and forms no part of the invention, hence the attachment means is not shown or further described herein.

The upper end 12 of the apparatus 10 comprises a fluid distensible log member 20 superimposed above a similar fluid distensible log member 22, as best seen in FIG. 5. The lower end 16 comprises the fluid distensible log member 24. Log members 20 and 24 are spaced apart by fluid distensible beam members 26 and 28, forming therewith a generally rectangular frame 27 superimposed above a generally U-shaped frame 29 having the log member 22 disposed at one end of the fluid distensible beam members 30 and 32, best seen in FIGS. 4, 5 and 6. The lower ends of the beam members 30 and 32 may terminate in a generally chamfered configuration, substantially as shown in FIG. 5 where these members and the log member 24 are adjacent to the ground plane, or may rest thereon.

The frame 27 forms the primary support for the sheet of relatively stretchable fabric material of which the slideway sheet 34 is comprised. This material may be coated on the top face thereof, if desired, to reduce friction and facilitate sliding thereover by evacuees. The ends of the sheet 34 are removably secured to the log members 20 and 24 and the sides of portions of the sheet 34 are detachably fastened to the beam members 26 and 28, all as described in detail hereinbelow.

The central longitudinal portion of the sheet 34 is also provided with support by the separator strip 36 which extends longitudinally of the frame 27 from the log member 20 to the log member 24 substantially midway between the beam members 26 and 28, as best seen in FIG. 2. The strip 36 is comprised of relatively non-stretchable fabric material wrapped over and detachably secured to the log members 20 and 24 by hook and pile fasteners, as will be described in detail hereinbelow. It will be observed in FIG. 2 that the lower end of the strip 36, for about 1/3 of its length, preferably is bifurcated and formed with the leg portions 38 and 40 which diverge a small amount from the crotch of the strip 36 to the attachment of the portions 38 and 40 to the log 24, for reasons set forth below.

In addition to central longitudinal support by the separator strip 36, portions of the edges of the slideway sheet 34 are supported by the beam members 26 and 28, being separably secured thereto by one-way snap fastening means, one assembly of which is illustrated by the general reference numeral 42 in FIG. 3. The assembly 42 comprises a button and socket member 44 on the edge of the sheet 34 and a stud and post member 46 on the fabric strip 48 cemented on the wall of the beam member 26. The one-way snap fastener arrangement, which is well-known in the fastening art, assures that the assembly 42 does not separate by tension applied by the sheet 34, but separates only by a peeling force applied substantially at the edge 50 of the button 44, which then pulls that edge away from the beam member 26 to separate the parts. A plurality of the assemblies 42 is employed, wherein the rows 52, 54, 56 and 58 of button and socket members are disposed on edge portions of the sheet 34, as shown in FIG. 2, and cooperative rows 60, 62, 64 and 66 of stud and post members are disposed on fabric strips on the beam members 26 and 28, as best seen on FIG. 9.

In addition to the support for the sheet 34 which the separator strip 36 affords cooperatively with the button fasteners, the ends 68 and 70 of the sheet 34 wrap over and partially around the log members 20 and 24, respectively, to be separably retained thereon by hook and pile fasteners of the type known as Velcro fasteners. Thus, as best seen on FIG. 9, the log member 20 has a pile fastener strip 72, for example, adapted to cooperate with a hook fastener strip 74 (FIG. 5) secured on the under face of the end 68 of the sheet 34. Likewise a pile fastener strip 78 on the log member 24 cooperates with a hook fastener strip 78 on the under face of the end 70 of the sheet 34.

As is well known, the hook and pile fasteners described aforesaid are characterized by high resistance to shear strains, but relatively low resistance to peel or stripping strains. Hence the ends 68 and 70 of the sheet 34 are adapted to remain secured on the log member 20 and 24 against tensions applied to the sheet 34 by the mass of evacuees thereon, but are readily peeled off therefrom when desired.

It will be observed on FIG. 5 that the slideway sheet 34 does not lie wholly within a plane defined by the upper surfaces of the frame comprised of the log and beam members 20, 24, 26 and 28. Rather, the wrapping end 68 of the sheet 34 merges into a slant portion 80 which angles downwardly to merge with another portion 82 which continues along a plane defined substantially by the bottom of the frame 27. The portion 82 then merges with yet another portion 84 which merges, in turn, with the wrapping end 70.

It is obvious, of course, that the apparatus 10 could be arranged with the slideway sheet 34 being disposed in the relatively simple configuration of a flat surfaced plane across the top surface of the frame 27. Nevertheless, the configuration shown and described hereinabove, comprising the angled portion 80 and 84 merging with the portion 82 on a bottom plane, provides a more useful embodiment for two reasons: (a) the steeply angled portion 80 serves as an accelerator for the evacuees, and the flatter angled portion 84 serves as a decelerator; and (b) the beam members 26 and 28 provide, for a substantial portion of their length, a rail-like safety measure to confine evacuees to the slide. For this embodiment, it is preferred that each of the portions 80, 82 and 84 define roughly one-third the length of the slide surface of the slideway sheet 34.

It is equally obvious that the displacement of the sheet portion 80, 82 and 84 from a plane necessitates a similar angled displacement of portions of the separator strip 36. To effect this structural arrangement there is provided a strip 86 of relatively non-stretchable fabric material having one end thereof secured by cementing or sewing to the upper log member 20 and the other end similarly secured to the log member 24. The strip 86 is secured to the members 20 and 24 about midway along their length so as to underlie the separator strip 36. The strips 36 and 86 are, in fact, bonded by cementing or sewing together for the lengths thereof that underlie the flat portion 82 of the slideway sheet 34. Stretching the strip 86 in taut condition between the log members 20 and 24 effects the displacement of the strip 36 and of the sheet 34 as aforesaid.

The apparatus 10 serves in the slide mode, as described hereinabove, by providing side-by-side slideway paths effectively separated by the tension in the separator strips 36 and 86, as illustrated by the arrows 88 in FIG. 4. Thus side-by-side sliding masses on the slideway sheet 34 are disposed in separated concavities in the sheet rather than gravitating to the center of a single concavity in the absence of the separator strip 36. Furthermore, as illustrated by the arrows 90 of FIG. 6, it is seen that with the bifurcation of the strip 36 at its lower end to form the diverging leg portions 38 and 40, the sliding masses of the evacuees are caused to diverge and separate still more as the lower end of the slide is approached.

In the slide configuration, the U-shaped frame 29 affords additional girder strength to the overlying rectangular frame 27. The U-shaped frame also provides a redundancy safety factor in the buoyant flotation mode shown in FIG. 9. As shown therein, the apparatus 10 is provided with wing-like assemblies 92 and 94 extending transversely from the slide assembly. Assembly 92 comprises a C-shaped tubular upper member 96 extending from one end of each of the log members 20 and 24 and superimposed above a similar C-shaped tubular lower member 98 extending from one end of the log member 22 and coupled to one end of a lower log member 100. Assembly 94 comprises a C-shaped tubular upper member 102 extending from the other end of each of the log members 20 and 24 and superimposed above a similar C-shaped tubular lower member 104 extending from the other end of the log member 22 and coupled to the other end of the lower log member 100. The C-shaped members 96, 98, 102 and 104, and the lower log member 100 are fluid distensible, flexible wall members separately inflatable from the slide frames 27 and 29. Thus, the log members 20, 22 and 24 do not communicate with the C-shaped members 96, 98, 102 and 104, but are provided with bulkheads against such communication.

The separate inflation of the slide frame members and the C-shaped members may be accomplished by means well-known in the art, and which may comprise separate compressed air bottles or cool gas generators, which are well-known in the art, and which are coupled to the separately inflatable members and frames by hoses or other means which require no detailed description herein. Thus, for example as shown in FIG. 5, compressed air bottles may be nested adjacent the log members 20 and 22 at the upper end of the slide, as exemplified by the bottle 106.

A fabric membrane 108 extends the full width and length of the apparatus 10 between the superimposed tubular assemblies to provide a water impervious floor for the flotation raft mode. It is seen that the central portion of the membrane 108 underlies the slideway sheet 34, hence the ends 68 and 70 thereof (and the ends of the separator strip 36) may be unwrapped from the log members 20 and 24 as described hereinabove, whereafter the side edge rows of buttons 52, 54, 56 and 58 may be unsnapped from the rows of posts 60, 62, 64 and 66 to permit the end portions 80 and 84 of the sheet 34 to be laid on the membrane 108 for added convenience of evacuees occupying the raft.

Figure 7:
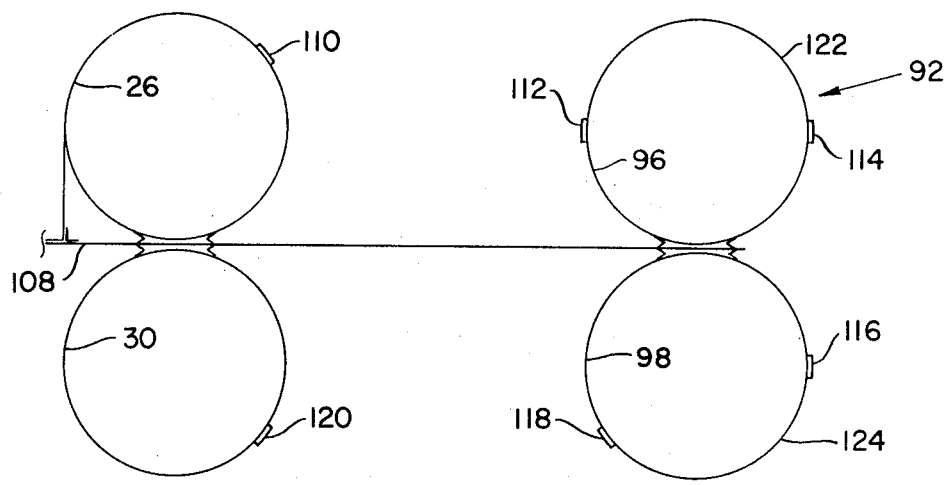
FIG. 7 is a schematic view to illustrate placement of the means for detachably securing inflatable flotation raft members as utilized in the slide mode.
Figure 8:
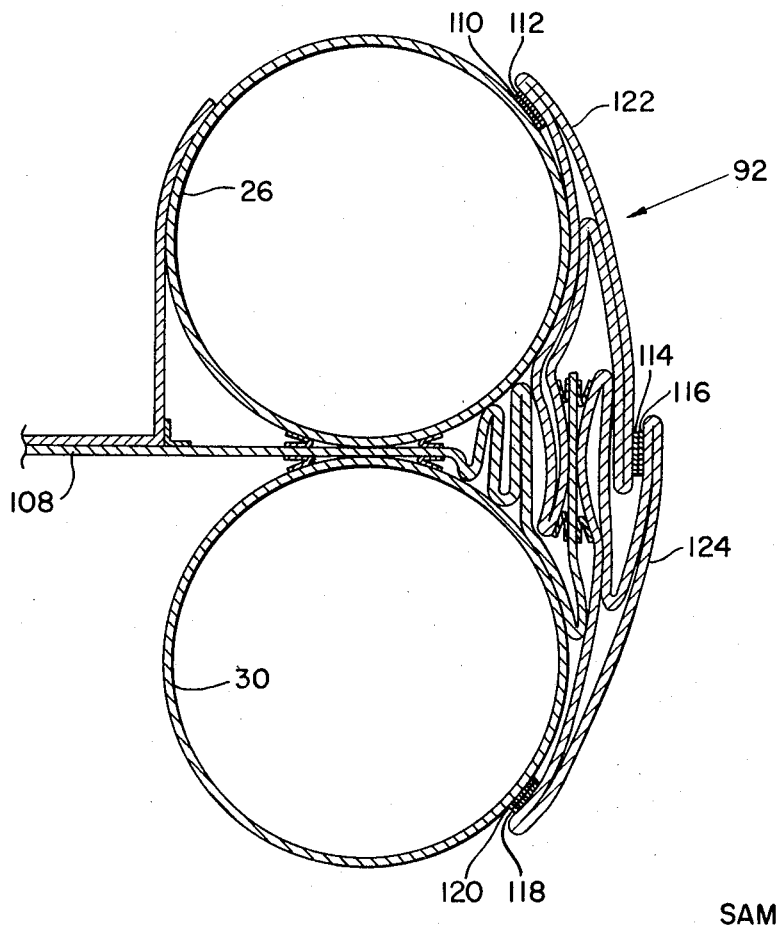
FIG. 8 is an enlarged fragmentary cross-section view taken on the line 8—8 of FIG. 2.

It is an important feature of the invention that the apparatus 10 is proved with detachable securing means whereby the winglike assemblies 92 and 94 of the raft mode, when uninflated are folded adjacent and secured to the beam members 26, 28, 30 and 32. Thus, in the slide mode, as depicted in FIG. 1, there is no drooping drape of the wing-like assemblies to be free to flop dangerously in any cross wind present. To this end the beam member 26 is provided with a row of fastener means 110 cooperable with a row of mating fastener means 112 on the tubular member 96, as best seen in FIGS. 7, 8 and 9. Fastener means 110 may be a pile fastener and means 112 may be a hook fastener of the Velcro hook and pile fastener type previously referred to hereinabove.

Tubular member 96 is also provided with a row of fastener means 114 cooperable in similar fashion with a row of mating fastener means 116 on the tubular member 98. Likewise, a row of fastener means 118 on tubular member 98 is cooperable in like fashion with a row of mating fastener means 120 on the tubular beam member 30. It is now seen that the wall portion 122 of tubular member 96 and wall portion 124 of tubular member 98 serve to enclose the various other wall portions of the members 96 and 98, together with the portion 126 of the floor membrane 108, substantially as illustrated in FIG. 8.

Upon inflation of the wing-like assembly 92, the hook and pile fasteners 110, 112, 114, 116, 118 and 120 peel readily by expansion of the tubular members 96 and 98 to permit full inflation and shaping of the tubular members.

It will be noted that on the other side of the apparatus 10, the wing-like assembly 94 is similarly detachably secured to the beam members 28 and 32 by similar hook and pile fastening means, and that the lower log member 100 is similarly situated with respect to the beam members 30 and 32 as indicated at reference numeral 128 on FIG. 5. Preferably as illustrated on FIG. 9, the strips 110, 112, 114 and 116 of hook and pile fasteners are segmented in order to facilitate folding and stowing the apparatus 10 when uninflated. Thus, if the strips were continuous there would obtain a stiff condition since the hook and pile fastener elements are disposed on relatively heavy and stiff fabric members which are difficult to fold back on themselves, especially so when the hook and pile fasteners are secured together.

I claim:

1. Slide apparatus for side-by-side evacuation from one elevated egress hatchway to a lower ground plane, comprising:
   a. a first end member adapted to be deployed and securely positioned adjacent said egress hatchway;
   b. a second end member adapted to be deployed and positioned at rest adjacent said ground plane;
   c. side beam means adapted to space said first and second end members apart and in said positions;
   d. a flexible sheet of somewhat stretchably resilient material secured to said end members and said beam means to form therewith a slideway path for side-by-side escape of evacuees through said egress hatchway when said members are positioned,
   said sheet tending to be stretched somewhat into a generally concave configuration by the mass of said evacuees; and
   e. a separator strip of flexible but relatively non-stretchable material secured to said sheet and to said end members, the securement of said strip to said first end member being substantially mid-way between the ends thereof, said strip tending to separate said evacuees for non-interfering decent, the mass of each of said evacuees tending to cause separate concavities in said sheet on either side of said strip, one end of said strip being bifurcated for a substantial distance along the length thereof forming a pair of spaced-apart diverging leg portions secured to said second end member.

2. The slide apparatus of claim 1 in which said end members and said beam means are inflatable, flexible walled, fluid distensible elements which when inflated form a substantially elongate, rectangular slide apparatus frame.

3. Slide apparatus for side-by-side evacuation from one elevated egress hatchway to a lower ground plane, comprising:
   a. a first end member adapted to be deployed and securely positioned adjacent said egress hatchway;
   b. a second end member adapted to be deployed and positioned at rest adjacent said ground plane;
   c. side beam means adapted to space said first and second end members apart and in said positions, said end members and said beam means being inflatable, flexible walled, fluid distensible elements which when inflated form a substantially elongate, rectangular primary frame;

d. a fluid distensible generally tubular secondary frame fixedly disposed relative to said primary frame and having a peripheral tubular member arranged to be deployed and spaced apart from said primary frame when inflated;

e. means for detachably securing said secondary frame to said beam means when said secondary frame is unifiated;

f. a flexible sheet of somewhat strechably resilient material secured to said end members and said beam means to form therewith a slideway path for side-by-side escape of evacuees through said egress hatchway when said members are positioned, said sheet tending to be stretched somewhat into a generally concave configuration by the mass of said evacuees; and g. a separator strip of flexible but relatively non-stretchable material secured to said sheet and to said end members, the securement of said strip to said first end member being substantially mid-way between the ends thereof, said strip tending to separate said evacuees for non-interfering descent, the mass of each of said evacuees tending to cause separate concavities in said sheet on either side of said strip.

4. The apparatus of claim 3 in which said primary and secondary frames are separately inflatable.

5. The apparatus of claim 3 in which said detachable securing means is comprised of mating fasting means of the hook and pile type.

6. Inflatable slide apparatus which is suitable for use as a life raft, comprising:

first and second inflatable tubular end members;

a pair of inflatable beams extending between said end members, said beams being spaced apart from each other, said end members and said beams being arranged in substantially coplanar relation and having an upper side and a lower side, a flexible sheet of water impermeable material, said impermeable sheet being secured between said beams and said end members and being spaced inwardly from said upper side to form an occupant receiving space;

a flexible slide sheet superimposed on the upper side of each of said end members and extending along said beams to form a continuous slide surface from said first end member to said second end member, the intermediate portion of said slide sheet being secured along said beams at locations spaced inwardly from said upper side and being superimposed on said impermeable sheet, said beams serving as rails along said intermediate portion to retain evacuees on the slide; and separable connector means between said slide sheet and said respective end members and beams, thereby allowing said slide sheet to be disengaged from said end members and said beams for access to portions of said occupant receiving space.

7. The slide apparatus of claim 6 including a flexible strip extending longitudinally of said beams, said strip being supported on the upper side of said end members underlying said slide sheet and extending between said slide sheet and said impermeable sheet, said strip being spaced between said beams to divide said slide sheet into a plurality of slide passages.

8. The slide apparatus of claim 6 including a third inflatable tubular end member, said third end member being parallel to and adjacent to said first end member, and including a second pair of inflatable beams extending longitudinally of said first-mentioned pair of beams, said third end member and said second pair of beams being arranged in substantially coplanar relation and having an upper said and a lower side, said water impermeable sheet extending between the beams of said first and second pairs of beams and between said first and third end members, thereby providing a substantially flat floor when said slide apparatus is used as a raft.

9. The slide apparatus of claim 6 including a tension strip of relatively non-stretchable material secured between said intermediate portion of said slide sheet and said lower side of the respective end members, said tension strip being positioned for holding said intermediate portion of said slide sheet adjacent said water impermeable sheet, thereby causing said slide sheet between said end members and said intermediate portion to be arranged in inclined relations with said water impermeable sheet, whereby said slide sheet has an accelerator portion adjacent one end member and a decelerator portion adjacent the other end member.

10. The slide apparatus of claim 9 including a third inflatable tubular end member positioned parallel to said first end member on the lower side thereof, and including a second pair of inflatable beams extending along the first-mentioned pair of beams on the lower side thereof, said water impermeable sheet extending between said first and third end members and between said first and second pairs of beams, thereby providing a substantially flat raft floor.

11. Inflatable escape slide apparatus for side-by-side evacuation from one elevated egress hatchway to a lower ground plane, comprising:

a. a first end member adapted to be deployed and positioned adjacent said egress hatchway;

b. a second end member adapted to be deployed and positioned at rest adjacent said ground plane;

c. a pair of inflatable side beams extending between said first and second end members and when inflated said beams space said end members apart;

d. a separator strip of flexible, but relatively non-stretchable material extending longitudinally of said slide and spaced between said side beams, said strip being secured to each of said end members;

e. a flexible sheet of material secured to said end members and along each of said beams, said sheet extending continuously across the width of said slide between said beams and being superimposed on said strip, said sheet thereby forming a slideway path for side-by-side escape of evacuees.

12. The slide apparatus of claim 11 wherein said end members each are inflatable and have an upper side and a lower side, said strip being secured to each of said end members on said upper side, and including an auxiliary strip secured between said lower side of each of said end members, said auxiliary strip being secured to said separator strip intermediate said end members, whereby said auxiliary strip reduces sagging of said separator strip between said end members and provides a steeper slope of said separator strip adjacent said first end member than along said intermediate portion, and less slope adjacent said second end member.

* * * * *

UNITED STATES PATENT OFFICE
CERTIFICATE OF CORRECTION

Patent No. 3,679,025                     Dated  July 25, 1972

Inventor(s)            Samuel L. Rummel

It is certified that error appears in the above-identified patent and that said Letters Patent are hereby corrected as shown below:

In the Claims:

Column 6, line 57, change "decent" to -- descent --;
Column 7, line 8, change "uniflated" to -- uninflated --;
Column 8, line 7, change "said", first occurrence to -- side --.

Signed and sealed this 6th day of March 1973.

(SEAL)
Attest:

EDWARD M. FLETCHER, JR.          ROBERT GOTTSCHALK
Attesting Officer                Commissioner of Patents